(12) United States Patent
Katsuramaki et al.

(10) Patent No.: US 10,377,341 B2
(45) Date of Patent: Aug. 13, 2019

(54) WINDING DEVICE AND WIRING STRUCTURE

(71) Applicant: Yazaki Corporation, Minato-ku, Tokyo (JP)

(72) Inventors: Takahiko Katsuramaki, Susono (JP); Goro Nakamura, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 85 days.

(21) Appl. No.: 15/854,944

(22) Filed: Dec. 27, 2017

(65) Prior Publication Data

US 2018/0178751 A1    Jun. 28, 2018

(30) Foreign Application Priority Data

Dec. 28, 2016 (JP) ................................. 2016-255699

(51) Int. Cl.
  *B60J 7/00* (2006.01)
  *B60R 22/46* (2006.01)
  *B60R 16/027* (2006.01)

(52) U.S. Cl.
  CPC ........ *B60R 22/4604* (2013.01); *B60R 16/027* (2013.01)

(58) Field of Classification Search
  CPC ....... H01L 2924/00; H01L 2224/32225; H01L 2924/00014; H01L 2224/48227; H01L 2224/73265; B60R 16/027; H01F 38/14; H02J 7/025; A01K 89/015; A01K 89/0193
  USPC ....................................................... 296/208
  See application file for complete search history.

(56) References Cited

U.S. PATENT DOCUMENTS

| 3,657,491 A | * | 4/1972 | Ryder | ................ B65H 75/4434 191/12.2 R |
| 3,705,962 A | * | 12/1972 | Banister | ................ H02G 11/02 191/12.4 |
| 3,926,385 A | * | 12/1975 | Board | ................... B60R 22/353 242/381.4 |

(Continued)

FOREIGN PATENT DOCUMENTS

| CN | 103848291 A | 6/2014 |
| CN | 104115356 A | 10/2014 |

(Continued)

OTHER PUBLICATIONS

Feb. 27, 2019—(CN) The First Office Action—App 201711439835.7.

*Primary Examiner* — Kiran B Patel
(74) *Attorney, Agent, or Firm* — Banner & Witcoff, Ltd.

(57) ABSTRACT

A winding device includes a case that includes a cable lead-out path, a rotating body that is accommodated in the case and is supported to be rotatable, and a cable that has one end connected to the rotating body to be wound in the case and the other end passing through the cable lead-out path of the case to be pulled out to an outside of the case. In the winding device, a first foreign substance removing portion and a second foreign substance removing portion which remove foreign substances pulled in together with the cable, are provided in the cable lead-out path, and the second foreign substance removing portion is capable of removing the foreign substances smaller than the foreign substances that are removable by the first foreign substance removing portion.

8 Claims, 7 Drawing Sheets

(56) References Cited

U.S. PATENT DOCUMENTS

| | | | | |
|---|---|---|---|---|
| 4,384,688 | A * | 5/1983 | Smith | B65H 75/4434 |
| | | | | 191/12.2 R |
| 4,989,805 | A * | 2/1991 | Burke | B65H 75/44 |
| | | | | 242/378.2 |
| 5,094,396 | A * | 3/1992 | Burke | B65H 75/44 |
| | | | | 242/375 |
| 5,332,171 | A * | 7/1994 | Steff | B65H 75/38 |
| | | | | 242/378 |
| 5,590,749 | A * | 1/1997 | Wagner | H02G 11/02 |
| | | | | 191/12.4 |
| 5,701,981 | A * | 12/1997 | Marshall | H02G 11/02 |
| | | | | 191/12.4 |
| 7,086,687 | B2 | 8/2006 | Aoki et al. | |
| 8,387,763 | B2 * | 3/2013 | Burke | B65H 75/4449 |
| | | | | 191/12.2 R |
| 8,800,907 | B2 * | 8/2014 | Koenig | H04R 1/1033 |
| | | | | 191/12.4 |
| 9,221,361 | B1 * | 12/2015 | Platt | B60N 2/163 |
| 9,409,746 | B2 | 8/2016 | Hamada | |
| 9,550,460 | B2 * | 1/2017 | Tsubaki | B60R 16/027 |
| 9,698,587 | B2 | 7/2017 | Katsuramaki et al. | |
| 10,087,040 | B2 * | 10/2018 | Morey | B65H 75/4434 |
| 2005/0264033 | A1 | 12/2005 | Aoki et al. | |
| 2006/0052194 | A1 * | 3/2006 | Gerring | F16H 7/1263 |
| | | | | 474/109 |
| 2009/0178887 | A1 * | 7/2009 | Reeves | A62B 1/10 |
| | | | | 182/239 |
| 2013/0200195 | A1 * | 8/2013 | Ono | B60R 22/34 |
| | | | | 242/382 |
| 2014/0000322 | A1 * | 1/2014 | Williams | E05B 73/0011 |
| | | | | 70/18 |
| 2014/0263801 | A1 * | 9/2014 | Skowronski | B65H 75/4449 |
| | | | | 242/397.5 |
| 2014/0353415 | A1 * | 12/2014 | Katsuramaki | H02G 11/02 |
| | | | | 242/371 |
| 2015/0001327 | A1 * | 1/2015 | Hamada | B65H 75/44 |
| | | | | 242/376 |
| 2015/0020558 | A1 * | 1/2015 | Williams | B62H 5/00 |
| | | | | 70/18 |
| 2016/0013627 | A1 * | 1/2016 | Katsuramaki | B65H 75/28 |
| | | | | 242/377 |
| 2017/0013343 | A1 * | 1/2017 | Tomlinson | B65H 75/4431 |
| 2017/0170641 | A1 * | 6/2017 | Tsubaki | H02G 11/00 |
| 2017/0294767 | A1 * | 10/2017 | Sano | B60R 16/0215 |
| 2018/0050643 | A1 * | 2/2018 | Bilandzija | B60R 21/06 |
| 2018/0116406 | A1 * | 5/2018 | Galbreath | B64D 11/0639 |
| 2018/0274582 | A1 * | 9/2018 | Asano | F16C 1/262 |

FOREIGN PATENT DOCUMENTS

| | | |
|---|---|---|
| CN | 105143078 A | 12/2015 |
| CN | 205709201 U | 11/2016 |
| JP | H10-310332 A | 11/1998 |
| JP | 3467465 B2 | 11/2003 |
| JP | 2006-015981 A | 1/2006 |
| JP | 2013249181 A | 12/2013 |

* cited by examiner

| SUBSTANCES | OUTER DIAMETER | DETERMINATION |
|---|---|---|
| GRAVEL /SAND | φ3mm | × |
| | φ2mm | × |
| | φ1mm | × |
| | φ0.5mm | ○ |
| | φ0.2mm | ○ |
| | φ0.1mm OR LESS | ○ |

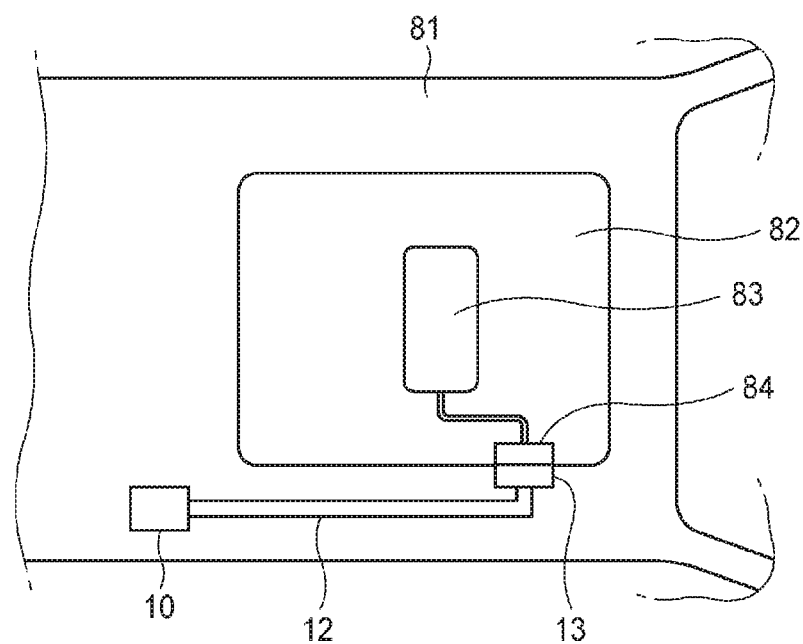

WINDING DEVICE AND WIRING STRUCTURE

CROSS REFERENCE TO RELATED APPLICATION

This application is based on Japanese Patent Application No. 2016-255699 filed on Dec. 28, 2016, the contents of which are incorporated herein by reference.

BACKGROUND OF THE INVENTION

1. Technical Field

The present invention relates to a winding device and a wiring structure.

2. Background Art

For example, in a vehicle, such as an automobile, a flat cable for supplying electricity from a vehicle body to an apparatus on a moving body, such as a slide seat, is wired. The flat cable is wound around a winding device provided on the vehicle body, and is pulled out as the moving body slides (for example, JP-A-2006-015981).

However, in a case where the flat cable pulled out of the winding device is wound around the winding device, when foreign substances, such as sand or waste, adhere to the flat cable, the foreign substances enter the winding device together with the flat cable, and in the winding device, the foreign substances may be interposed between the wound flat cables. Then, when pulling out and winding the flat cable, there is concern that the flat cable and the foreign substances are scraped and the flat cable is damaged.

In addition, a load increases when winding the flat cable due to the foreign substances that have entered the winding device, a burden on a spring for winding the flat cable in the winding device increases, and there is concern that the winding of the flat cable is not smoothly performed.

The invention has been made in consideration of the above-described problem, and an object thereof is to provide a winding device which can maintain a smooth winding operation of a cable by suppressing entrance of foreign substances to the inside as much as possible, and a wiring structure including the same.

SUMMARY OF THE INVENTION (1) According to an aspect of the invention, a winding device includes a case that includes a cable lead-out path, a rotating body that is accommodated in the case and is supported to be rotatable, and a cable that has one end connected to the rotating body to be wound in the case and the other end passing through the cable lead-out path of the case to be pulled out to an outside of the case, wherein a first foreign substance removing portion and a second foreign substance removing portion which remove foreign substances pulled in together with the cable, are provided in the cable lead-out path, and the second foreign substance removing portion is capable of removing the foreign substances smaller than the foreign substances that are removable by the first foreign substance removing portion.

(2) In the winding device of (1), the first foreign substance removing portion is capable of removing the foreign substances having an outer diameter equal to or greater than 1 mm.

(3) In the winding device of (1) or (2), the second foreign substance removing portion includes a sliding member that slides on a surface of the cable moving in the cable lead-out path.

(4) In the winding device of (3), the sliding member is formed of a porous elastic material.

(5) In the winding device of (3) or (4), the sliding member includes a plurality of first tongue-like portions slidable on one side of the cable and a plurality of second tongue-like portions slidable on the other side of the cable, the first and second tongue-like portions are disposed alternately in the pulling-in direction of the cable.

(6) According to another aspect of the invention, a wiring structure includes the winding device of any one of (1) to (5), wherein the case is provided in a vehicle body, and the cable pulled out of the case is connected to an electrical device of a moving body provided to be slidable with respect to the vehicle body.

(7) In the wiring structure of (6), the moving body is a slide seat provided to be slidable with respect to a floor of the vehicle body.

(8) In the wiring structure of (6), the moving body is a movable roof which is provided to be slidable with respect to a roof of the vehicle body.

According to the winding device having the above-described configuration (1), when the cable pulled out of the case is wound around the rotating body and is pulled into the case, large foreign substances which are pulled in together with the cable as adhering to the surface of the cable, or the like, are removed by the first foreign substance removing portion, and further, smaller foreign substances are removed by the second foreign substance portion. Accordingly, it is possible to suppress damage or winding failure of the cable which are caused as the foreign substances are pulled into the case together with the cable, and to maintain a smooth winding operation of the cable.

In addition, since the first foreign substance removing portion and the second foreign substance removing portion gradually remove the foreign substances, compared to a case where the large foreign substances and the small foreign substances which are pulled in together with the cable are removed by one foreign substances removing portion, it is possible to reliably remove the large foreign substances and the small foreign substances, and to improve durability.

According to the winding device having the above-described configuration (2), it is possible to remove foreign substances having the outer diameter equal to or greater than 1 mm and causing damage of the cable as being pulled into the case, thereby suppressing the damage of the cable.

According to the winding device having the above-described configuration (3), as the sliding member slides on the surface of the moving cable, the small foreign substances which adhere to the surface of the cable are removed.

According to the winding device having the above-described configuration (4), the sliding member formed of a porous elastic material adsorbs and reliably removes the small foreign substances which adhere to the surface of the cable.

According to the winding device having the above-described configuration (5), since the tongue-like portions which are disposed respectively differently from each other in the sliding member reliably slide on the cable, the small foreign substances which adhere to the surface of the cable are reliably wiped.

According to the wiring structure having the above-described configuration (6), with respect to an electrical component, such as an electrical device installed on the moving body, it is possible to supply power from the power source installed on the vehicle body and to perform control by the control device installed on the vehicle body via the cable. In addition, in the winding device, since the entrance of the foreign substances into the case is suppressed as much as possible when the moving body slides, it is possible to prevent trouble from occurring.

According to the wiring structure having the above-described configuration (7), with respect to the electrical device of the slide seat, it is possible to supply power from the power source on the vehicle body and to perform control by the control device on the vehicle body via the cable. In addition, since the entrance of the foreign substances, such as waste or sand which remains on the floor, is suppressed in the winding device as much as possible when the slide seat slides, it is possible to prevent trouble from occurring.

According to the wiring structure having the above-described configuration (8), with respect to the electrical device of the movable roof, it is possible to supply power from the power source on the vehicle body and to perform control by the control device on the vehicle body via the cable. In addition, since the entrance of the foreign substances, such as waste or sand, of the roof of the vehicle is suppressed in the winding device as much as possible when the movable roof slides, it is possible to prevent trouble from occurring.

According to the invention, it is possible to provide a winding device which can maintain a smooth winding operation of a cable by suppressing the entrance of foreign substances to the inside as much as possible, and a wiring structure including the same.

Above, the invention is briefly described. Furthermore, by thoroughly reading an aspect (hereinafter, referred to as an "embodiment") for implementing the invention described hereinafter with reference to the attached drawings, specific contents of the invention will become more apparent.

BRIEF DESCRIPTION OF DRAWINGS

FIG. 8 is a schematic plan view of a movable roof including the winding device which winds the flat cable.

DETAILED DESCRIPTION OF EMBODIMENTS

A specific embodiment according to the invention will be described hereinafter with reference to each of the drawings.

Figure 1:
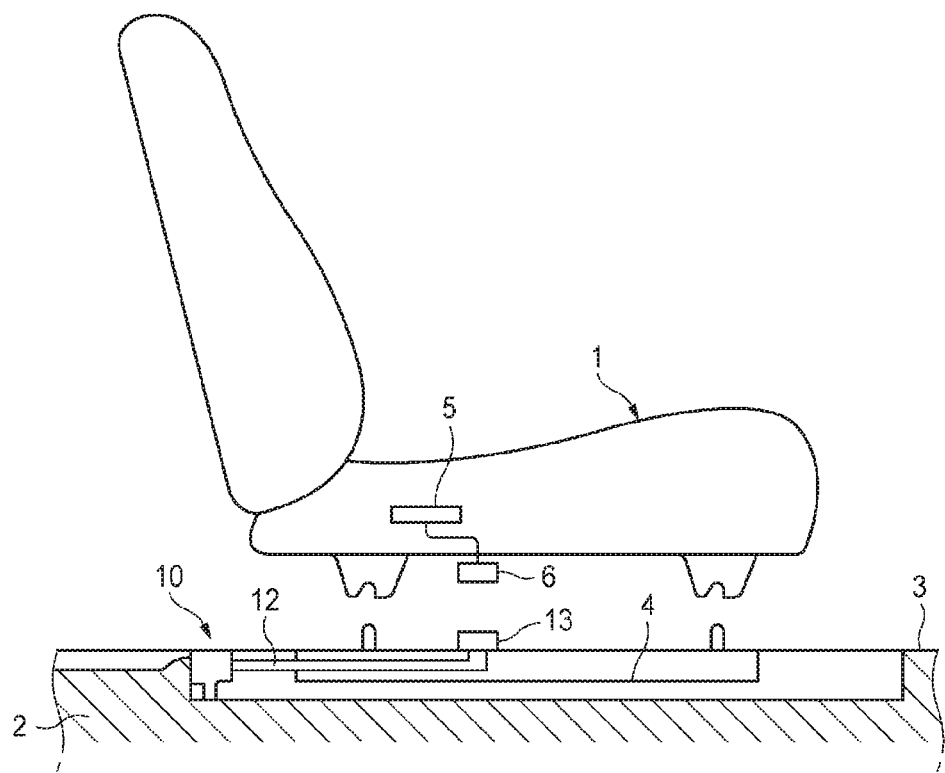
FIG. 1 is a schematic side view of a slide seat including a winding device which winds a flat cable.

FIG. 1 is a schematic side view of a slide seat including a winding device which winds a flat cable.

As illustrated in FIG. 1, a winding device 10 according to the embodiment is provided in a slide seat (moving body) 1. The slide seat 1 is slidably attached to a rail 4 provided on a floor 3 that configures a vehicle body 2. The winding device 10 is fixed to the floor 3 of the vehicle body 2.

A flat cable (cable) 12 is pulled out of the winding device 10, and the flat cable 12 is wired along the rail 4. In an end portion of the flat cable 12, a connector 13 is provided, and the connector 13 is connected to a connector 6 of an electrical device 5 provided in the slide seat 1. Accordingly, with respect to the electrical device 5, it is possible to supply power from a power source on the vehicle body 2, and to perform control by a control device on the vehicle body 2 via the flat cable 12. As the electrical device 5 of the slide seat 1, for example, there is a seating sensor, a seat belt sensor, a seat heater or the like.

The flat cable 12 is, for example, a belt plate-like cable in which a plurality of conductors arranged in parallel are coated with a synthetic resin, and can be bent in a surface direction. In addition, as the flat cable 12, a cable in which one conductor formed to have a rectangular section is coated with a synthetic resin may be employed.

Figure 2:
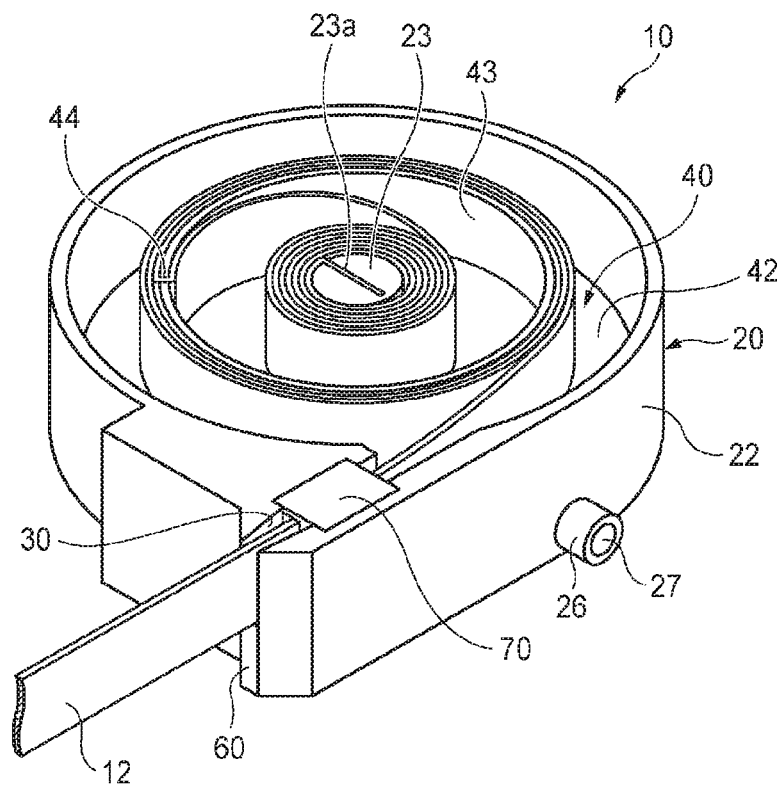
FIG. 2 is a perspective view illustrating a state where a cover of the winding device according to an embodiment is removed.
Figure 3:
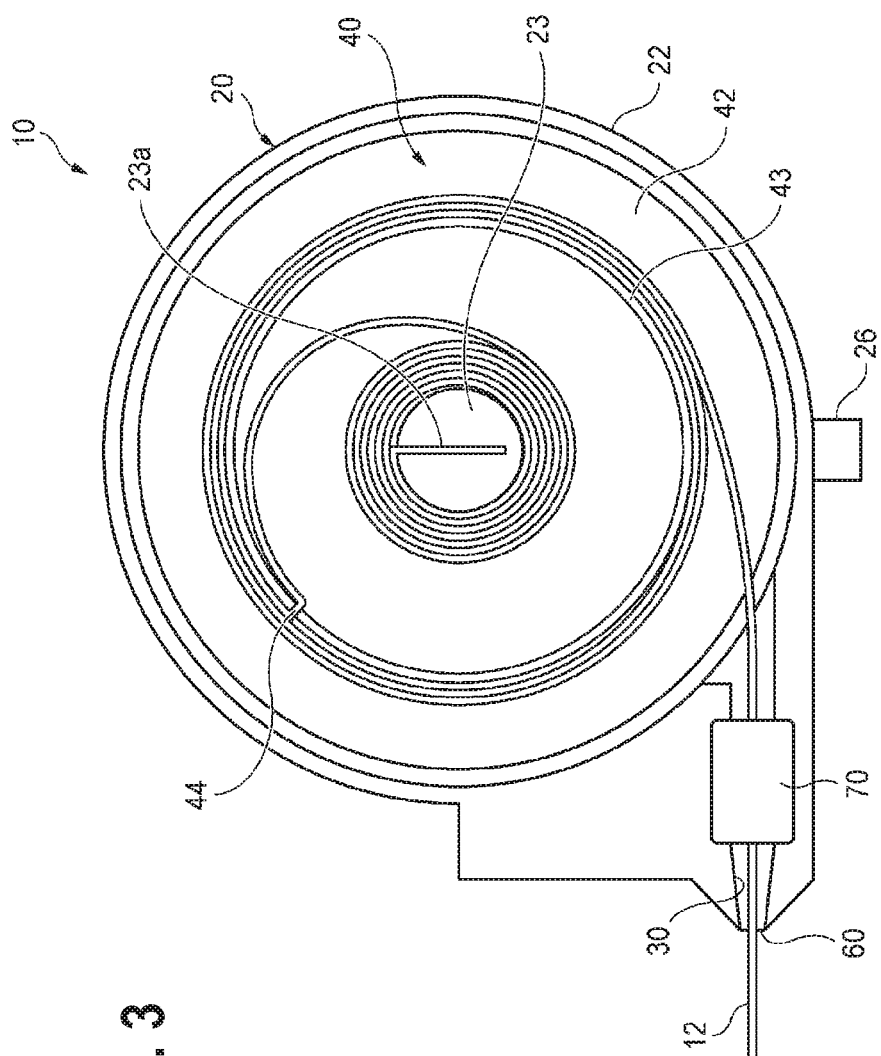
FIG. 3 is a plan view illustrating the state where the cover of the winding device according to the embodiment is removed.
Figure 4:
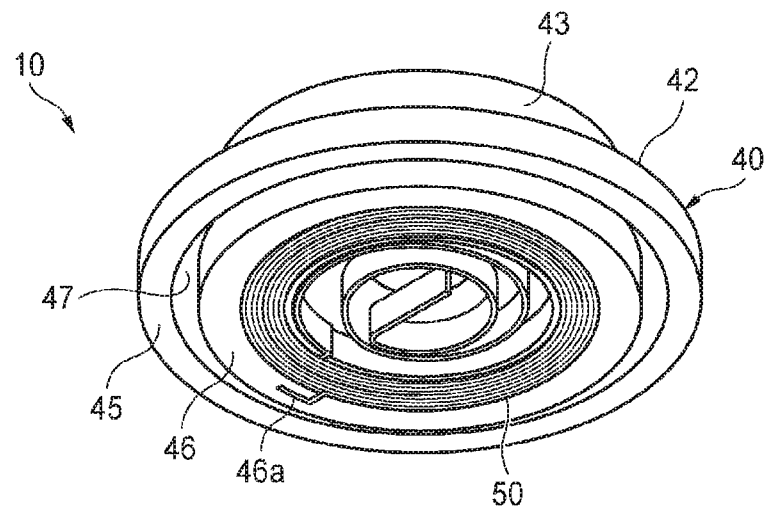
FIG. 4 is an exploded perspective view of the winding device according to the embodiment.
Figure 4:
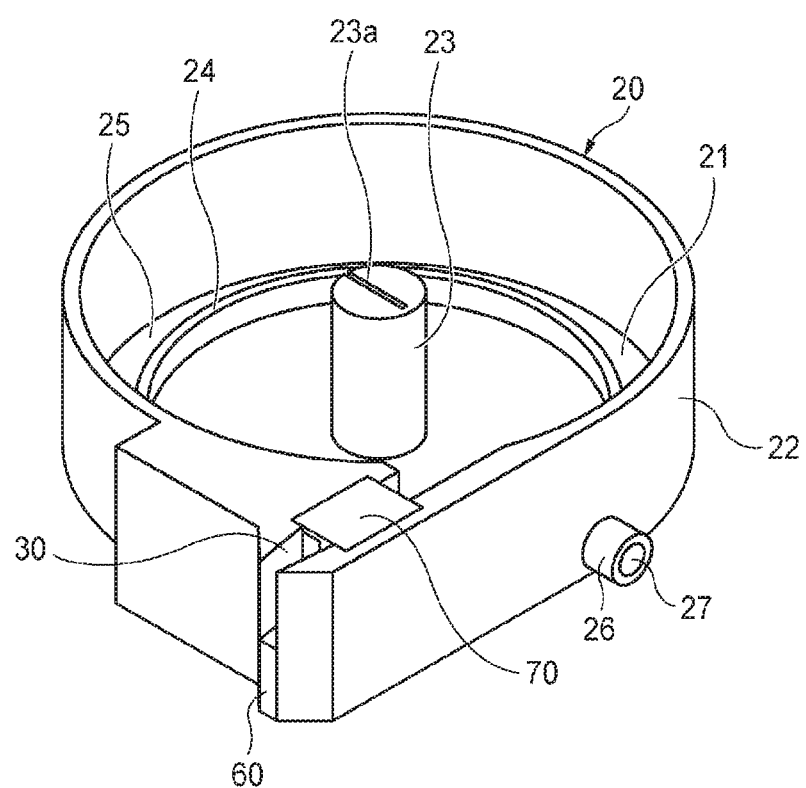
Figure 5:
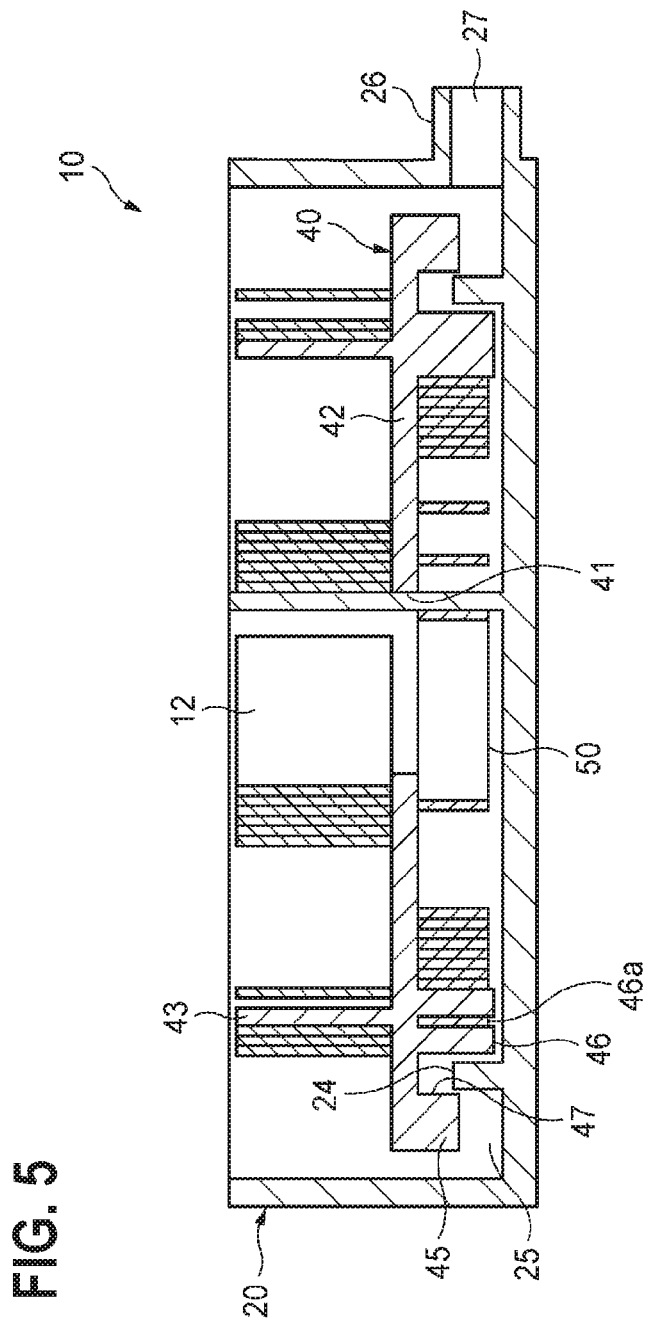
FIG. 5 is a sectional view along an upward-and-downward direction of the winding device according to the embodiment.

FIG. 2 is a perspective view illustrating a state where a cover of the winding device according to the embodiment is removed. FIG. 3 is a plan view illustrating the state where the cover of the winding device according to the embodiment is removed. FIG. 4 is an exploded perspective view of the winding device according to the embodiment. FIG. 5 is a sectional view along an upward-and-downward direction of the winding device according to the embodiment.

As illustrated in FIGS. 2 to 5, the winding device 10 is a device which winds the flat cable 12. The winding device 10 includes a case 20, a rotation table (rotating body) 40, and the flat cable 12.

The case 20 includes a bottom plate portion 21, and a cylindrical circumferential wall portion 22 which stands from the circumference of the bottom plate portion 21. In the bottom plate portion 21, at the center position thereof, a spindle 23 having a locking groove 23a stands. In addition, in the bottom plate portion 21, at a position in the vicinity of the circumferential wall portion 22, a projection strip portion 24 which protrudes upward along a circumferential direction is formed. In the case 20, between the projection strip portion 24 and the circumferential wall portion 22 in the bottom plate portion 21, an annular dust collecting groove 25 is formed. In addition, in the vicinity of a lower end of the circumferential wall portion 22 in the case 20, a discharge portion 26 which protrudes sideward is formed. In the discharge portion 26, a discharge path 27 which communicates with the dust collecting groove 25 is formed.

In the case 20, a cable lead-out path 30 is provided, and in the cable lead-out path 30, the flat cable 12 is pulled out to the outside. In addition, a cover (not illustrated) is mounted in an upper portion of the case 20 and the case 20 is closed.

The rotation table 40 includes a disk-like table portion 42 in which an insertion hole 41 is formed at the center. The rotation table 40 is accommodated in the case 20 such that the spindle 23 is inserted into the insertion hole 41 of the table portion 42. Accordingly, the rotation table 40 is supported to be rotatable by the spindle 23 in the case 20.

On an upper surface of the table portion 42 of the rotation table 40, a cylindrical partition wall portion 43 is formed. At a part of the partition wall portion 43, a slit 44 along an axial direction is formed.

On an inner circumference of the partition wall portion 43, one end of the flat cable 12 is accommodated in a wound state, and the one end of the flat cable 12 is inserted into the locking groove 23a formed in the spindle 23 and is locked. The flat cable 12 locked to the spindle 23 is pulled out upward or downward, and is connected to a wire harness provided on the vehicle body 2. An intermediate portion of the flat cable 12 is inserted into the slit 44 of the partition wall portion 43. In addition, the other end of the flat cable 12 is wound on the outer circumference of the partition wall portion 43, and is pulled out to the outside from the cable lead-out path 30.

At a circumferential edge of the table portion 42 of the rotation table 40, a projection portion 45 which protrudes downward along the circumferential direction is formed. In addition, on a lower surface of the table portion 42, a cylindrical spring accommodation wall portion 46 is formed on an inner circumference with a space with respect to the projection portion 45. In addition, in the table portion 42, a part between the projection portion 45 and the spring accommodation wall portion 46 on a lower surface thereof serves as an annular groove portion 47 along the circumferential direction. An upper end part of the projection strip portion 24 formed in the bottom plate portion 21 of the case 20 enters the groove portion 47.

On the inner circumference of the spring accommodation wall portion 46, a spiral spring 50 is accommodated. An end portion on the outer circumference of the spiral spring 50 is engaged with and fixed to a fixing groove 46a formed in the spring accommodation wall portion 46. In addition, the end portion on the inner circumference of the spiral spring 50 is engaged with and fixed to the locking groove 23a formed in the spindle 23 of the case 20. Accordingly, the rotation table 40 is biased in a rotating direction to one direction by a biasing force of the spiral spring 50. Specifically, the spiral spring 50 biases the rotation table 40 in the rotating direction in a direction in which the flat cable 12 pulled out from the cable lead-out path 30 enters the case 20.

In the winding device 10 having the above-described structure, when the slide seat 1 slides in one direction, the flat cable 12 is pulled out from the cable lead-out path 30 in accordance with the sliding, and accordingly, the rotation table 40 is rotated. Then, a rotating force in a reverse direction is applied to the rotation table 40 by the biasing force of the spiral spring 50. In this state, when the slide seat 1 slides in the other direction, the rotation table 40 is rotated in the reverse direction by the biasing force of the spiral spring 50, and accordingly, the pulled-out flat cable 12 is pulled into the case 20 from the cable lead-out path 30.

Figures 6, 7:
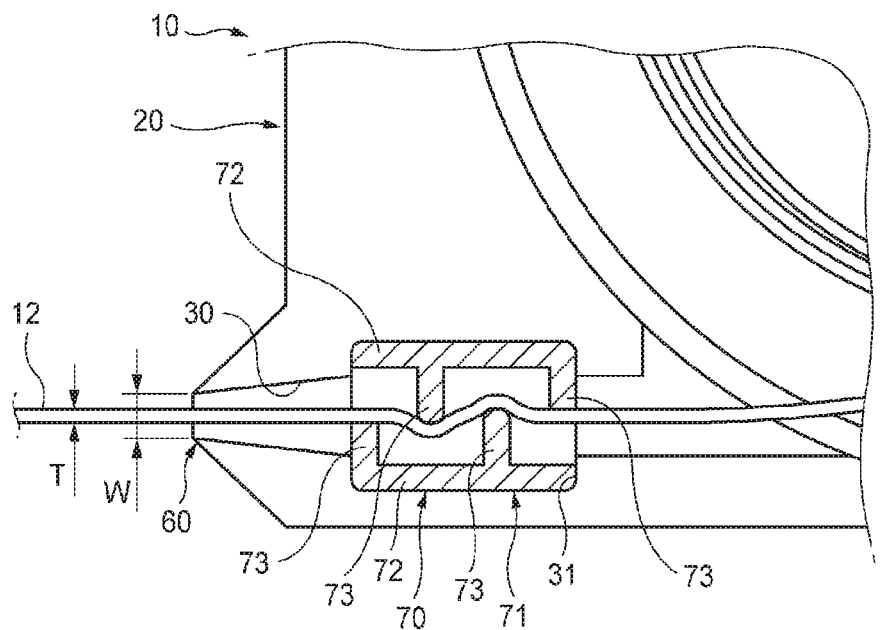
FIG. 6 is a sectional view along a horizontal direction in a cable lead-out path of the winding device.
FIG. 7 is a table illustrating an evaluation result of an influence on the winding device caused by foreign substances which adhere to the flat cable.

FIG. 6 is a sectional view along a horizontal direction in the cable lead-out path of the winding device.

As illustrated in FIG. 6, in the cable lead-out path 30 of the winding device 10, a first foreign substance removing portion 60 and a second foreign substance removing portion 70 are provided. Since both of the first foreign substance removing portion 60 and the second foreign substance removing portion 70 remove the foreign substances pulled in as adhering or the like to the flat cable 12 pulled into the case 20 from the cable lead-out path 30, the second foreign substance removing portion 70 can remove foreign substances smaller than foreign substances which are removable by the first foreign substance removing portion 60.

By using the first foreign substance removing portion 60, it is possible to remove the foreign substances which adhere to the surface of the flat cable 12 and have the outer diameter equal to or greater than 1 mm. The first foreign substance removing portion 60 is configured of an outlet part of the cable lead-out path 30. In the first foreign substance removing portion 60, the cable lead-out path 30 has a diaphragm shape which becomes narrower toward the outlet. In the first foreign substance removing portion 60, a difference between a width dimension W thereof and a thickness dimension T of the flat cable 12 is equal to or less than 1 mm. In other words, between the width dimension W of the first foreign substance removing portion 60 and the thickness dimension T of the flat cable 12, the following expression (1) is established.

$$W-T \leq 1 \text{ mm} \tag{1}$$

The second foreign substance removing portion 70 is provided further on the inner side of the case 20 than the first foreign substance removing portion 60 in the cable lead-out path 30. The second foreign substance removing portion 70 includes a sliding member 71. The sliding member 71 slides on the surface of the flat cable 12 pulled into the case 20, and removes small foreign substances which adhere to the surface of the flat cable 12. The sliding member 71 is engaged with an accommodation recess portion 31 formed in the cable lead-out path 30.

The sliding member 71 is formed of a porous elastic material, such as sponge. The sliding member 71 includes side plate portions 72 disposed to face each other along the flat cable 12, and a plurality of tongue-like portions 73 which protrude toward the flat cable 12 from the side plate portions 72. The tongue-like portions 73 are disposed respectively differently from each other along the pulling-in direction of the flat cable 12, and come into contact with the flat cable 12. The tongue-like portions 73 which protrude from one side plate portion 72 are slightly lapped in a protruding direction with respect to the tongue-like portions 73 which protrude from the side plate portion 72 on the opposite side. Accordingly, the flat cable 12 which has passed between the tongue-like portions 73 that protrude from the side plate portions 72 meanders while being slightly curved at locations that abut against the tongue-like portions 73.

In the winding device 10, when the pulled-out flat cable 12 is pulled into the case 20, the foreign substances which adhere to the surface of the flat cable 12 and have the outer diameter equal to or greater than 1 mm, are removed by the first foreign substance removing portion 60. Furthermore, in the flat cable 12, as the tongue-like portion 73 of the sliding member 71 of the second foreign substance removing portion 70 slides, the foreign substances which adhere to the surface of the flat cable 12 and have the outer diameter less than 1 mm are removed.

Here, in the winding device 10, the result of evaluating the influence on the flat cable 12 caused as the flat cable 12 in which gravel or sand adheres to the surface thereof is pulled into the case 20, is illustrated.

FIG. 7 is a table illustrating an evaluation result of the influence on the winding device caused by the foreign substances which adhere to the flat cable.

As illustrated in FIG. 7, in a case where the outer diameter of the foreign substances which adhere to the surface of the flat cable 12 is equal to or greater than 0.1 mm, is 0.2 mm, and is 0.5 mm, an influence, such as damage of the flat cable 12, was not found, and there was no trouble, such as winding failure of the flat cable 12. Meanwhile, in a case where the outer diameter of the adhering foreign substances is 1 mm, 2 mm, and 3 mm, the flat cable 12 was damaged, or trouble, such as winding failure or the like of the flat cable 12, occurred.

In the winding device 10 according to the embodiment, when the flat cable 12 is pulled into the case 20, the first foreign substance removing portion 60 removes the foreign substances which adhere to the surface of the flat cable 12 to cause the damage of the flat cable 12, the foreign substances having the outer diameter equal to or greater than 1 mm. Accordingly, it is possible to suppress the damage or the winding failure of the flat cable 12 caused as the foreign substances which adhere to the flat cable 12 are pulled into the case 20 together with the flat cable 12. In the winding device 10 according to the embodiment, when the flat cable 12 pulled out of the case 20 is wound around the rotation table 40 and is pulled into the case 20, the small foreign substances which adhere to the surface of the flat cable 12, and have the outer diameter less than 1 mm are removed by the second foreign substance removing portion 70. Accordingly, it is possible to maintain a smooth winding operation of the flat cable 12.

In this manner, since the first foreign substance removing portion 60 and the second foreign substance removing portion 70 remove the foreign substances on the surface of the flat cable 12 in stages, compared to a case where the large foreign substances and the small foreign substances which are pulled in together with the flat cable 12 are removed by one foreign substances removing portion, it is possible to reliably remove the large foreign substances and the small foreign substances, and further, to improve durability.

Therefore, according to a wiring structure including the winding device 10, since the entrance of the foreign substances into the case 20 when the slide seat 1 slides is suppressed as much as possible, it is possible to prevent trouble at a wiring location from occurring.

In particular, as the second foreign substance removing portion 70 slides on the surface of the flat cable 12 in which the sliding member 71 formed of a porous elastic material, such as sponge, moves, it is possible to absorb and reliably remove the small foreign substances which adhere to the surface of the flat cable 12.

In addition, since the tongue-like portions 73 which are disposed respectively differently from each other in the sliding member 71 reliably slide on the flat cable, it is possible to reliably wipe the small foreign substances which adhere to the surface of the flat cable.

In addition, even when extremely fine foreign substances, such as dust, enter the case 20, the foreign substances remain in the dust collecting groove 25 of the case 20, and after this, the foreign substances are discharged to the outside from the discharge path 27 of the discharge portion 26. Therefore, trouble that the fine foreign substances adhere to the spiral spring 50 and influence the winding operation of the flat cable 12, can also be avoided.

Furthermore, the invention is not limited to the above-described embodiment, and appropriate modifications or improvements are possible. In addition to this, the material, the shape, the dimension, the number, the disposition location and the like of each configuration element in the above-described embodiment are arbitrary and are not limited as long as the invention can be achieved.

In the above-described embodiment, the wiring structure in which the flat cable 12 is supposed to be wired between the vehicle body 2 and the slide seat 1 that slides with respect to the vehicle body 2, and the winding device 10 is provided on the floor 3 of the vehicle body 2, is described as an example, but the wiring structure including the winding device 10 is not limited to the structure in which the flat cable 12 is wired between the vehicle body 2 and the slide seat 1.

As illustrated in FIG. 8, for example, a wiring structure in which the winding device 10 is provided between a movable roof (moving body) 82 provided to be slidable in a roof 81 of the vehicle body 2, and the vehicle body 2, and the connector 13 of the flat cable 12 is connected to a connector 84 of an electrical device 83 of the movable roof 82, may be employed. In this case, with respect to the electrical device 83 of the movable roof 82, it is also possible to supply the power from a power source on the vehicle body 2, and to perform control by a control device on the vehicle body 2 via the flat cable 12. In addition, since the entrance of the foreign substances into the case 20 is suppressed as much as possible in the winding device 10 when the movable roof 82 slides, it is possible to prevent trouble at the wiring location from occurring. Furthermore, as the wiring structure including the winding device 10, for example, a wiring structure in which the winding device 10 is provided between a slide door provided to be slidable with respect to the vehicle body 2, and the vehicle body 2, may be employed.

Here, characteristics of the embodiment of the winding device and the wiring structure according to the above-described invention are summarized and described briefly in each of the following [1] to [8].

[1] A winding device (10) including:
a case (20) including a cable lead-out path (30);
a rotating body (rotation table 40) which is accommodated in the case (20) and is supported to be rotatable; and
a cable (flat cable 12) having one end connected to the rotating body (rotation table 40) and wound in the case (20), and the other end passing through the cable lead-out path (30) of the case (20) and pulled out to an outside of the case,
in which a first foreign substance removing portion (60) and a second foreign substance removing portion (70) which remove foreign substances which are pulled in together with the cable (flat cable 12), are provided in the cable lead-out path (30), and
the second foreign substance removing portion (70) is capable of removing the foreign substances smaller than the foreign substances that are removable by the first foreign substance removing portion (60).

[2] The winding device according [1], in which the first foreign substance removing portion (60) is capable of removing the foreign substances having an outer diameter equal to or greater than 1 mm.

[3] The winding device according [1] or [2], in which the second foreign substance removing portion (70) includes a sliding member (71) that slides on a surface of the cable (flat cable 12) moving in the cable lead-out path.

[4] The winding device according [3], in which the sliding member (71) is formed of a porous elastic material.

[5] The winding device according to [3] or [4], in which the sliding member (71) includes a plurality of tongue-like portions (73) which are disposed respectively differently from each other along the pulling-in direction of the cable (flat cable 12), and respectively slide on the cable (flat cable 12).

[6] A wiring structure including:
the winding device (10) according to any one of [1] to [5],
in which the case (20) is provided in a vehicle body (2), and
the cable (flat cable 12) pulled out of the case (20) is connected to an electrical component (electrical device 5) of a moving body provided to be slidable with respect to the vehicle body (2).

[7] The wiring structure according to [6], in which the moving body is a slide seat (1) provided to be slidable with respect to a floor (3) of the vehicle body (2).

[8] The wiring structure according to [6], in which the moving body is a movable roof (82) which is provided to be slidable with respect to a roof (81) of the vehicle body (2).

What is claimed is:

1. A winding device comprising:
   a case that includes a cable lead-out path;
   a rotating body that is accommodated in the case and is supported to be rotatable; and
   a cable that has one end connected to the rotating body to be wound in the case and the other end passing through the cable lead-out path of the case to be pulled out to an outside of the case,
   wherein a first foreign substance removing portion and a second foreign substance removing portion which remove foreign substances pulled in together with the cable, are provided in the cable lead-out path, and
   the second foreign substance removing portion is capable of removing the foreign substances smaller than the foreign substances that are removable by the first foreign substance removing portion.

2. The winding device according to claim 1,
   wherein the first foreign substance removing portion is capable of removing the foreign substances having an outer diameter equal to or greater than 1 mm.

3. The winding device according to claim 1,
   wherein the second foreign substance removing portion includes a sliding member that slides on a surface of the cable moving in the cable lead-out path.

4. The winding device according to claim 3,
   wherein the sliding member is formed of a porous elastic material.

5. The winding device according to claim 3,
   wherein the sliding member includes a plurality of first tongue-like portions slidable on one side of the cable and a plurality of second tongue-like portions slidable on the other side of the cable, the first and second tongue-like portions are disposed alternately in the pulling-in direction of the cable.

6. A wiring structure comprising:
   the winding device according to claim 1,
   wherein the case is provided in a vehicle body, and
   the cable pulled out of the case is connected to an electrical device of a moving body provided to be slidable with respect to the vehicle body.

7. The wiring structure according to claim 6,
   wherein the moving body is a slide seat provided to be slidable with respect to a floor of the vehicle body.

8. The wiring structure according to claim 6,
   wherein the moving body is a movable roof which is provided to be slidable with respect to a roof of the vehicle body.

* * * * *